(12) United States Patent
Allen et al.

(10) Patent No.: US 7,160,082 B2
(45) Date of Patent: Jan. 9, 2007

(54) TURBOCHARGER WITH BALANCING FEATURES

(75) Inventors: John F. Allen, El Segundo, CA (US); Gary R. Louthan, Westminster, CA (US)

(73) Assignee: Honeywell International Inc., Morristown, NJ (US)

( * ) Notice: Subject to any disclaimer, the term of this patent is extended or adjusted under 35 U.S.C. 154(b) by 151 days.

(21) Appl. No.: 10/972,825

(22) Filed: Oct. 25, 2004

(65) Prior Publication Data

US 2006/0088407 A1    Apr. 27, 2006

(51) Int. Cl.
*F03B 11/06* (2006.01)
*F04D 29/04* (2006.01)

(52) U.S. Cl. .................................... 415/229
(58) Field of Classification Search ......... 415/104, 415/107, 216.1, 229; 416/244 R
See application file for complete search history.

(56) References Cited

U.S. PATENT DOCUMENTS

| | | | |
|---|---|---|---|
| 3,494,679 A | 2/1970 | Burdette | |
| 4,986,733 A | 1/1991 | Fleury et al. | |
| 6,220,829 B1 | 4/2001 | Thompson et al. | |
| 6,669,372 B1 | 12/2003 | Martin | |
| 6,896,479 B1 * | 5/2005 | Svihla et al. | ................ 415/104 |
| 7,001,155 B1 * | 2/2006 | Cabrales et al. | ............. 417/319 |

FOREIGN PATENT DOCUMENTS

JP           58098629 A   *   6/1983

OTHER PUBLICATIONS

International Search Report, 3 pages.

* cited by examiner

*Primary Examiner*—Edward K. Look
*Assistant Examiner*—Dwayne J White
(74) *Attorney, Agent, or Firm*—Chris James; Brian Pangile

(57) ABSTRACT

An exemplary thrust collar for a turbocharger includes a substantially annular body that includes an axis of rotation, a bore, opposing end surfaces where one of the end surfaces is substantially normal to the axis of rotation and capable of seating a back end of compressor wheel, and a surface disposed in the bore where the surface is substantially normal to the axis of rotation and capable of seating a surface of a turbocharger shaft. The axial distance between the end surface for seating a back end of a compressor wheel and the surface disposed in the bore for seating a surface of a turbocharger shaft is selected to improve balancing of a rotating assembly. Various other exemplary devices, systems, methods, etc., are also disclosed.

30 Claims, 6 Drawing Sheets

TURBOCHARGER WITH BALANCING FEATURES

TECHNICAL FIELD

Subject matter disclosed herein relates generally to turbomachinery for internal combustion engines and, in particular, features that aid balancing rotating turbomachinery components.

BACKGROUND

A good quality of balance is extremely important for turbochargers not only for durability but to reduce unbalance forces that may be transmitted to structures and/or result in turbocharger noise or "whistle". Most conventional turbochargers include a turbine wheel, a shaft, a compressor wheel and other components that rotate as a group. To balance this group, a combination of component balancing and assembly balancing are typically used. For example, a compressor wheel may be balanced as a component using a balancing spindle and then affixed to a turbocharger shaft and balanced as an assembly.

With respect to assembly balancing, a commonly used practice monitors compressor wheel nose motion in a plane orthogonal to the axis of rotation. However, there can also be significant imbalance in the back plane of the compressor due to misalignment of components on assembly. One of the features that can lead to such misalignment is a locating feature on the turbine shaft and wheel assembly typically referred to as the "stub shaft shoulder". The stub shaft shoulder acts to locate the compressor wheel and another component, the rotating thrust collar.

When the compressor wheel and the thrust collar are tightened against the stub shaft shoulder, any misalignment with the centerline (axis of rotation) will lead to an offset of the compressor wheel's center of gravity.

In turn, an offset in the center of gravity will create imbalance in the back plane area. Consequently, this makes it very difficult to make a single plane correction without building in a "couple imbalance".

A need exists for technology that facilitates balancing of turbochargers. In particular, a need exists for technology that reduces or eliminates the need for back plane balancing as an assembly. Various exemplary devices, methods, systems, etc., disclosed herein aim to meet these needs and/or other needs.

BRIEF DESCRIPTION OF THE DRAWINGS

A more complete understanding of the various methods, devices, systems, arrangements, etc., described herein, and equivalents thereof, may be had by reference to the following detailed description when taken in conjunction with the accompanying drawings wherein.

DETAILED DESCRIPTION

Various exemplary methods, devices, systems, arrangements, etc., disclosed herein address issues related to technology associated with turbochargers.

Figure 1:
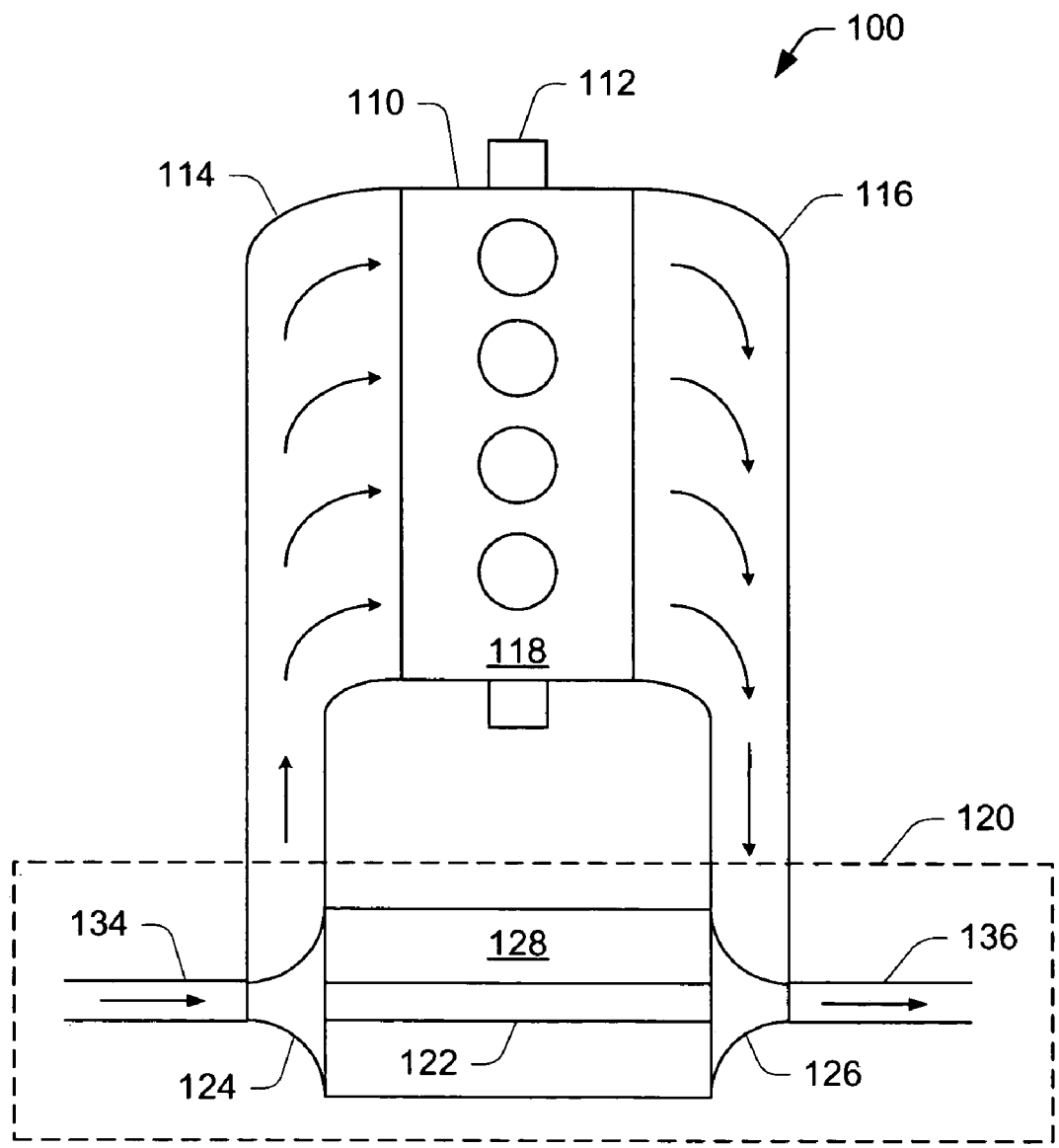
FIG. 1 is a diagram of a conventional turbocharger and internal combustion engine.

Turbochargers are frequently utilized to increase the output of an internal combustion engine. Referring to FIG. 1, a prior art system 100, including an internal combustion engine 110 and a turbocharger 120 is shown. The internal combustion engine 110 includes an engine block 118 housing one or more combustion chambers that operatively drive a shaft 112. As shown in FIG. 1, an intake port 114 provides a flow path for air to the engine block 118 while an exhaust port 116 provides a flow path for exhaust from the engine block 118.

The turbocharger 120 acts to extract energy from the exhaust and to provide energy to intake air, which may be combined with fuel to form combustion gas. As shown in FIG. 1, the turbocharger 120 includes an air inlet 134, a shaft 122, a compressor 124, a turbine 126, a housing 128 and an exhaust outlet 136. The housing 128 may be referred to as a center housing as it is disposed between the compressor 124 and the turbine 126. The shaft 122 may be a shaft assembly that includes a variety of components.

Referring to the turbine 126, such a turbine optionally includes a variable geometry unit and a variable geometry controller. The variable geometry unit and variable geometry controller optionally include features such as those associated with commercially available variable geometry turbochargers (VGTs), such as, but not limited to, the GARRETT® VNT™ and AVNT™ turbochargers, which use multiple adjustable vanes to control the flow of exhaust across a turbine. Of course, an exemplary turbocharger may employ wastegate technology as an alternative or in addition to variable geometry technology.

Figure 2:
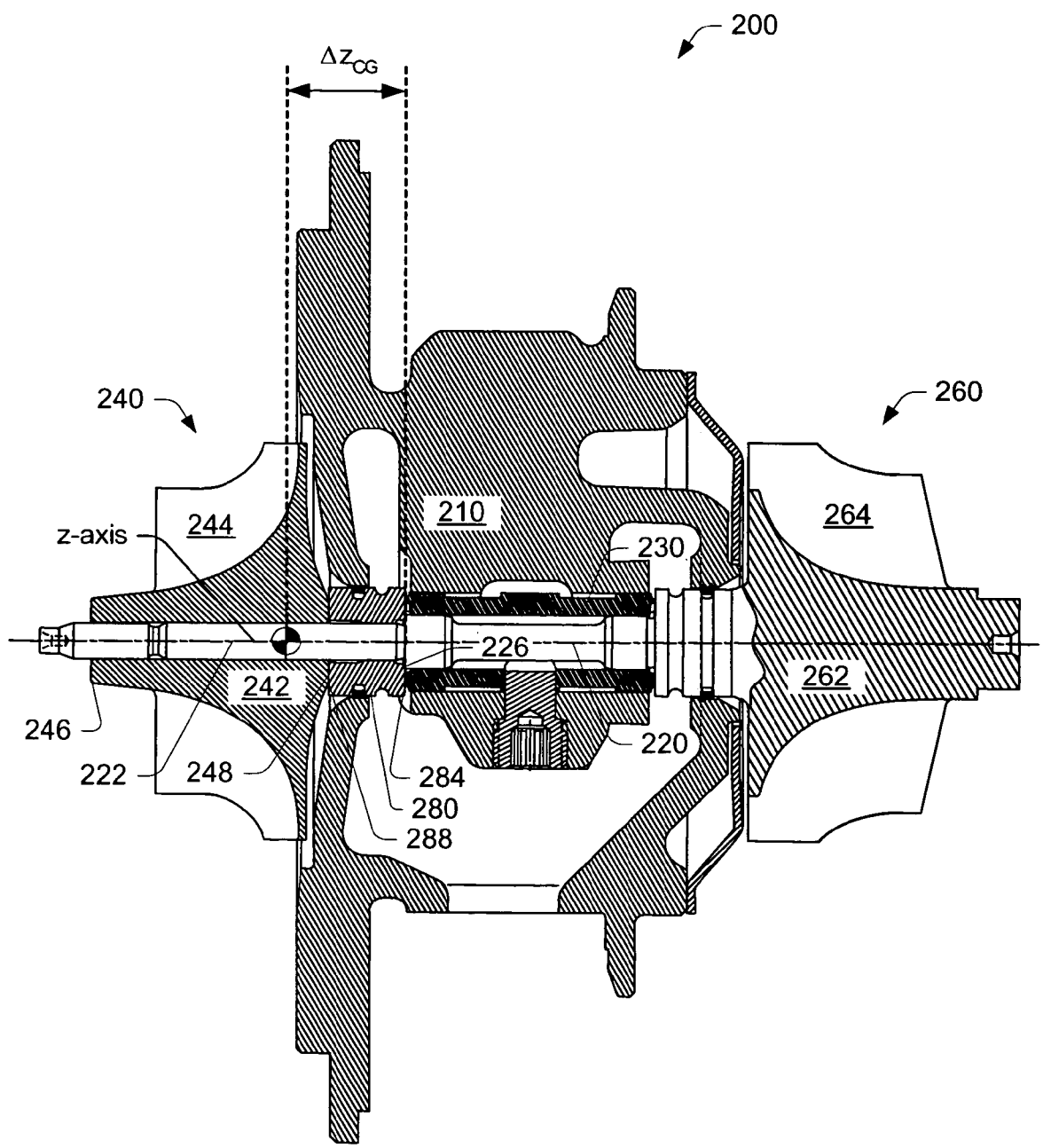
FIG. 2 is a cross-sectional view of a prior art turbocharger that includes a conventional thrust collar.

FIG. 2 shows a cross-section of a prior art turbocharger 200 suitable for use as the turbocharger 120 of FIG. 1. The turbocharger 200 serves as a non-limiting example to describe various exemplary devices, methods, systems, etc., disclosed herein. The turbocharger 200 includes a center housing 210, a shaft 220, a compressor wheel 240 and a turbine wheel 260 where the compressor wheel 240 and the turbine wheel 260 are operably connected to the shaft 220. The compressor wheel 240, the turbine wheel 260 and the shaft 220 have an axis of rotation substantially coincident to with the z-axis. The center housing 210 supports a bearing 230 that receives the shaft 220 and allows for rotation of the shaft 220 about the z-axis.

The compressor wheel 240 includes a hub 242 and a plurality of blades 244 and the turbine wheel 260 includes a hub 262 and a plurality of blades 264. The compressor wheel 240 further includes a center of gravity located between a nose end 246 and a back end 248. The shaft 220 includes a compressor shaft portion 222 that extends into a bore of the compressor wheel hub 242. In this example, the bore of the compressor wheel 240 extends from the back end 248 to the nose end 246. In other examples, a turbocharger may optionally include a boreless or other type of compressor wheel.

The turbocharger 200 includes a thrust collar 280 positioned between the back end 248 of the compressor wheel 240 and a surface 226 of the shaft 220. As such, the thrust collar 280 rotates with the compressor wheel 240 and the shaft 220. In particular, a surface 284 meets the surface 226 of the shaft 220 and an opposing surface 288 meets the back end 248 of the compressor wheel 240.

A distance $\Delta Z_{CG}$ exists between the center of gravity of the compressor wheel 240 and the plane where the surface 226 of the shaft 220 meets the surface 284 of the thrust collar 280. In the prior art turbocharger 200, the distance $\Delta Z_{CG}$ acts to magnify any imbalance associated with the back end 248 of the compressor wheel 240 and the surface 288 of the thrust collar 280. Various exemplary devices, methods, systems, etc., disclosed herein aim to reduce such effects.

Figure 3:
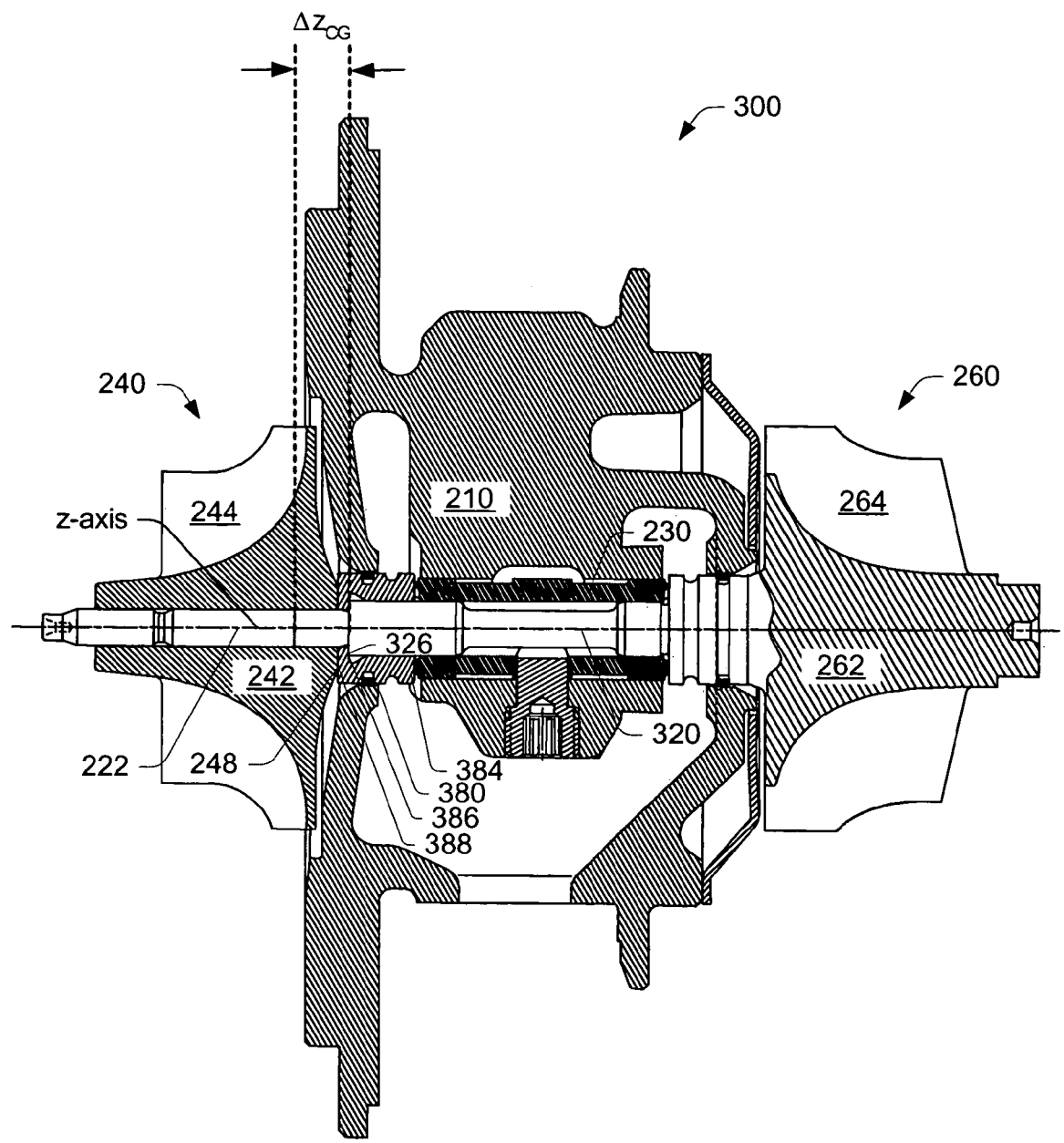
FIG. 3 is a cross-sectional view of an exemplary turbocharger that includes an exemplary thrust collar.

FIG. 3 shows a cross-section of an exemplary turbocharger 300 with various balancing features that is optionally suitable for use as the turbocharger 120 of FIG. 1. The turbocharger 300 includes various features of the turbocharger 200 of FIG. 2; however, importantly, differences exist with respect to the thrust collars.

The turbocharger 300 includes a center housing 210, a shaft 320, a compressor wheel 240 and a turbine wheel 260 where the compressor wheel 240 and the turbine wheel 260 are operably connected to the shaft 320. As described further below, the shaft 320 differs from the shaft 220 of the turbocharger 200 of FIG. 2. The compressor wheel 240, the turbine wheel 260 and the shaft 320 have an axis of rotation substantially coincident to with the z-axis. The center housing 210 supports a bearing 230 that receives the shaft 320 and allows for rotation of the shaft 320 about the z-axis.

The compressor wheel 240 includes a hub 242 and a plurality of blades 244 and the turbine wheel 260 includes a hub 262 and a plurality of blades 264. The compressor wheel 240 further includes a center of gravity located between a nose end 246 and a back end 248. The shaft 320 includes a compressor shaft portion 222 that extends into a bore of the compressor wheel hub 242. In this example, the bore of the compressor wheel 240 extends from the back end 248 to the nose end 246. The compressor shaft portion 222 may be different or substantially the same as the compressor shaft portion shown in FIG. 2. For example, in comparison to the turbocharger 200, the compressor shaft portion 222 is optionally shortened to fit the exemplary turbocharger 300.

In other examples, a turbocharger may optionally include a boreless or other type of compressor wheel. A compressor wheel may attach to a shaft via threads, a securing nut, or by other mechanisms. A compressor wheel is optionally constructed of aluminum or titanium. Because titanium is denser than aluminum, displacements in center of gravity with respect to rotational axis may be accentuated for titanium compressor wheels. Further, titanium is more difficult to machine than aluminum; thus, an exemplary thrust collar may act to reduce balancing and machining needs for titanium compressor wheels and thereby allow for improved economics or improved performance.

The turbocharger 300 includes a thrust collar 380 positioned in part by the back end 248 of the compressor wheel 240 and a surface 326 of the shaft 320. As such, the thrust collar 380 rotates with the compressor wheel 240 and the shaft 320. In particular, an internal surface 386 of the thrust collar 380 meets the surface 326 of the shaft 320 and an opposing surface 388 meets the back end 248 of the compressor wheel 240. In the prior art turbocharger 200, the external surface 284 of the thrust collar 280 meets the surface 226 of the shaft 220. In the exemplary turbocharger 300, the external surface 384 of the thrust collar 380 does not meet the shaft 320 and is typically adjacent a layer of lubricant during operation of the turbocharger 300. Of course, a shaft with a step may be used where a surface of the shaft meets an internal surface of an exemplary thrust collar and where another surface meets an external surface of the exemplary thrust collar. In either instance, an exemplary thrust collar includes an internal surface that meets a surface of a shaft.

As shown in FIG. 3, the exemplary thrust collar 380 includes a stepped bore, for example, a bore that includes an axially disposed surface 386 (or a surface of varying radial dimension with respect to axial dimension such as a conical surface, a multistep surface, etc.) positioned between two radially disposed surfaces where the surface can seat a shaft.

As in the prior art turbocharger 200, a distance $\Delta Z_{CG}$ exists between the center of gravity of the compressor wheel 240 and the plane where the surface 326 of the shaft 320 meets the surface 386 of the exemplary thrust collar 380. In comparison to the prior art turbocharger 200 of FIG. 2, the distance $\Delta Z_{CG}$ is shortened to thereby reduce imbalance. In particular, the exemplary thrust collar 380 relies on the internal surface 386 to shorten $\Delta Z_{CG}$ and thereby reduce imbalance associated with the back end 248 of the compressor wheel 240 and the surface 388 of the thrust collar 380.

Figure 4A:
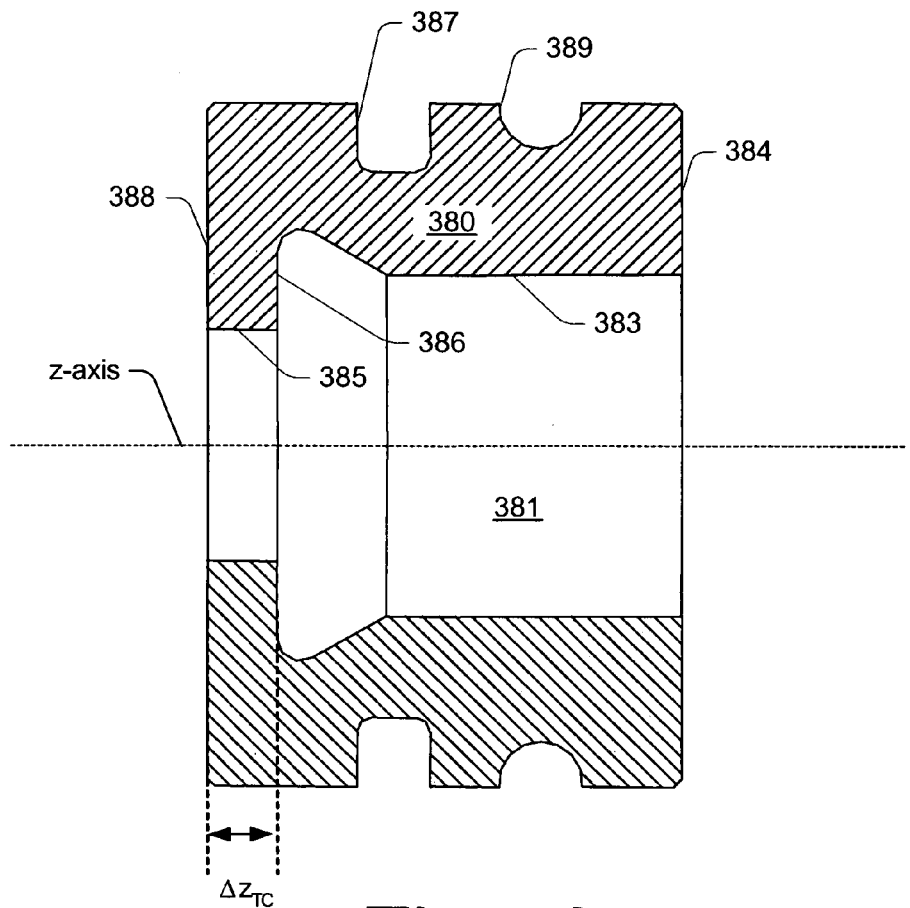
FIG. 4A is a cross-sectional view of an exemplary thrust collar.
Figure 4B:
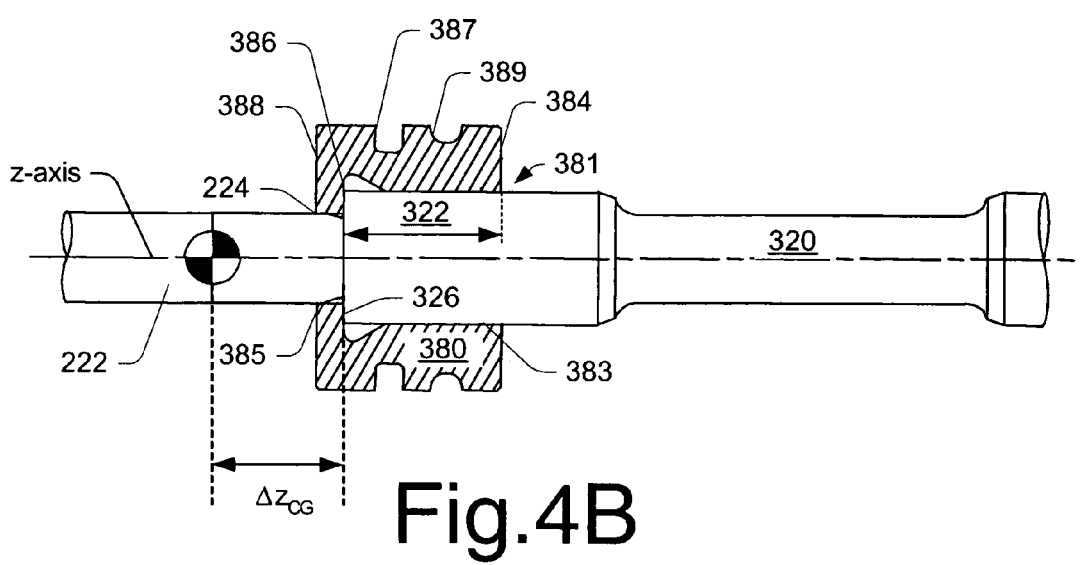
FIG. 4B is a cross-sectional view of the exemplary thrust collar of FIG. 4A and a portion of a shaft.

FIGS. 4A and 4B show the exemplary thrust collar 380. FIG. 4A shows a cross-section of the exemplary thrust collar 380 without a shaft while FIG. 4B shows a cross-section of the exemplary thrust collar 380 as positioned with respect to a shaft 320 and the center of gravity of a compressor wheel.

The exemplary thrust collar 380 reduces imbalance by shortening the distance between the center of gravity of a compressor wheel and a locating surface of a turbocharger shaft. In FIG. 4A, a distance $\Delta Z_{TC}$ represents the minimum axial distance between a surface of a compressor wheel and a surface of shaft. This distance is substantially shorter than in prior art turbochargers and thrust collars.

As shown in FIG. 4A, the exemplary thrust collar 380 includes axially disposed external surfaces 384 and 388 and a stepped bore 381 that extends between these two surfaces. The stepped bore 381 is substantially defined by radially disposed surfaces 383 and 385 and another surface 386 that includes an axial face that forms a step with the surface 385. In general, the surface 386 extends between the radially disposed surfaces 383 and 385.

In the example of FIG. 4, the axial face of the surface 386 is annular and, together with the external surface 388, defines the distance $\Delta Z_{TC}$. The axial face of the surface 386 extends from the surface 385 to a radius greater than that of the surface 383. The surface 386 may be formed using a tool that allows for a high degree of parallelism between the axial face of the surface 386 and the surface 388. In particular, the surface 386 allows for parallelism beyond that typically achieved by an axial face that joins two radially disposed surfaces.

Thus, an exemplary thrust collar may include a substantially annular body 380 that defines a stepped bore 381 and that includes an axis of rotation (e.g., z-axis), opposing end surfaces 384, 388 where the end surface 388 is substantially normal to the axis of rotation and capable of seating a back end of compressor wheel, and a surface 386 disposed in the stepped bore 381 where the surface 386 has an axial face substantially normal to the axis of rotation and capable of seating a surface of a shaft. In another example, the surface 386 may include a conical surface capable of seating a conical surface of a shaft. Other surface shapes are also possible.

The exemplary thrust collar 380 optionally includes one or more grooves 387, 389 that may serve one or more purposes. For example, the groove 387 may be used to seat a seal ring (e.g., piston ring, etc.) to form a seal between the thrust collar 380 and a center housing of a turbocharger (see, e.g., FIG. 3) and the groove 389 may assist in lubrication of the thrust collar.

FIG. 4B shows the exemplary thrust collar 380 of FIG. 4A along with a turbocharger shaft 320. As described with respect to FIG. 3, the shaft 320 includes the compressor wheel shaft portion 222 and the surface 326 that meets the internal surface 386 of the thrust collar 380. The stepped bore 381 of the thrust collar 380 receives at least a portion of the shaft 320, the portion labeled 322, which extends a distance along the z-axis into the stepped bore 381 of the thrust collar 380 to meet the surface 386. The radially disposed surface 383 of the thrust collar 380 meets a radially disposed surface of the shaft portion 322. The compressor wheel shaft portion 222 extends into the stepped bore 381 of the thrust collar 380 where a radially disposed surface 224 of the shaft portion 222 meets the radially disposed surface 385 of the thrust collar 380.

The distance $\Delta Z_{CG}$ is shown whereby part of the distance includes the distance $\Delta Z_{TC}$, as described in FIG. 4A. The axial face of the surface 386 allows for shortening of the distance $\Delta Z_{CG}$ and improved balancing of a rotating group of a turbocharger. Further, in this example, the exemplary thrust collar 380 only requires shaft modifications, i.e., modification to the center housing, the compressor wheel, etc., are not required to accommodate the exemplary thrust collar 380.

Figure 5A:
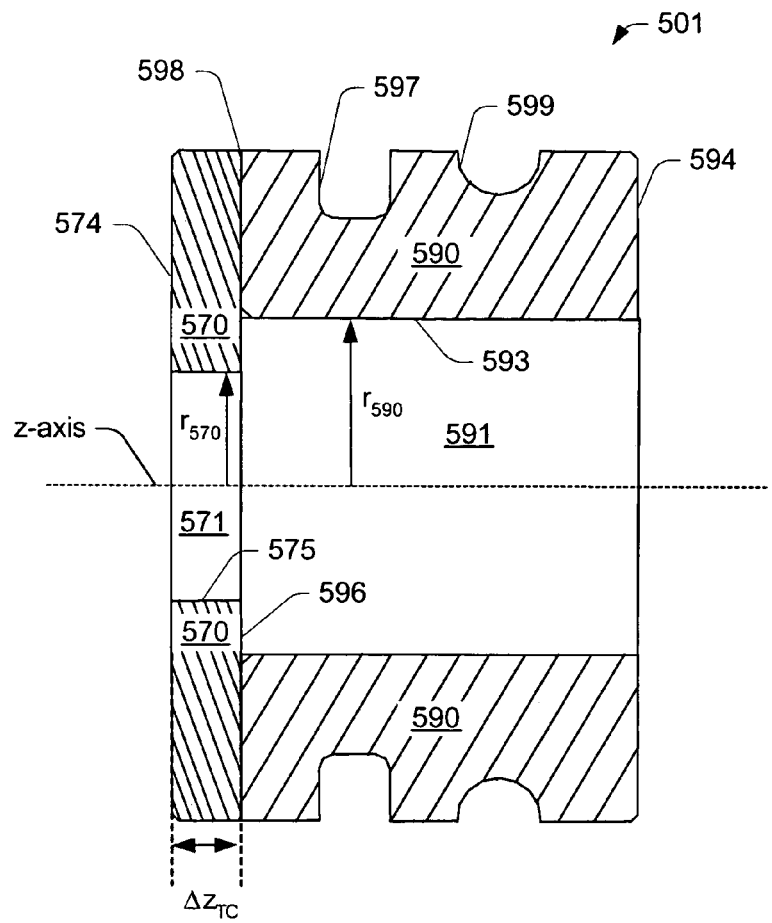
FIG. 5A is a cross-sectional view of another exemplary thrust collar.
Figure 5B:
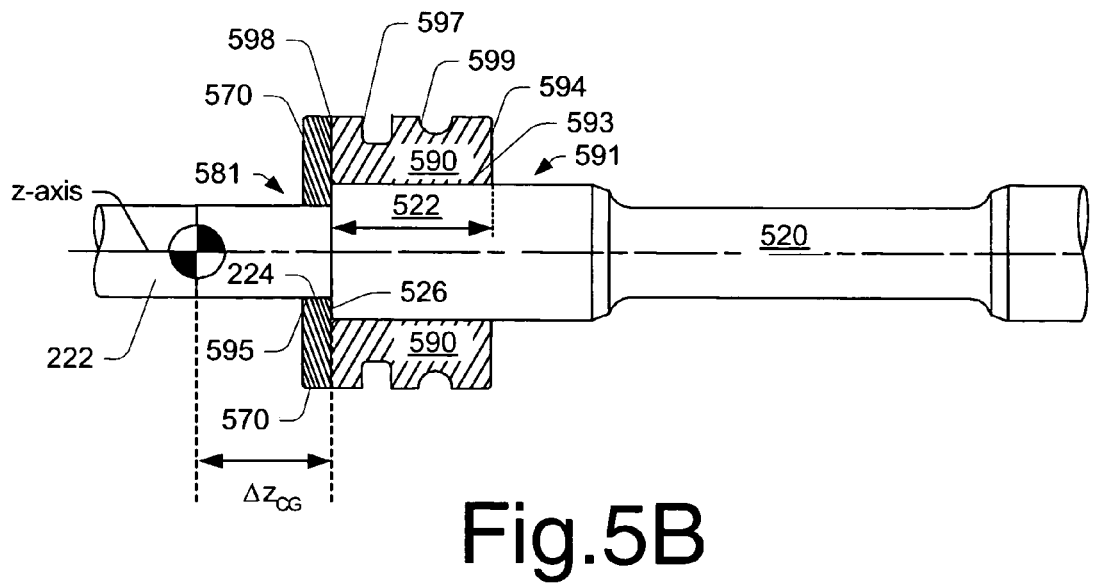
FIG. 5B is a cross-sectional view of the exemplary thrust collar of FIG. 5A and a portion of a shaft.

FIGS. 5A and 5B show another exemplary thrust collar 501 that includes a cylindrical piece 590 with an end cap 570. FIG. 5A shows a cross-section of the exemplary thrust collar 501 without a shaft while FIG. 5B shows a cross-section of the exemplary thrust collar 501 as positioned with respect to a shaft 320 and the center of gravity of a compressor wheel.

The exemplary thrust collar 501 reduces imbalance by shortening the distance between the center of gravity of a compressor wheel and a locating surface of a turbocharger shaft. In FIG. 5A, a distance $\Delta Z_{TC}$ represents the minimum axial distance between a surface of a compressor wheel and a surface of shaft. This distance is substantially shorter than in prior art turbochargers and thrust collars.

As shown in FIG. 5A, the exemplary thrust collar 501 includes a cylindrical piece 590 and a cap 570. When assembled, the cylindrical piece 590 and the cap 570 form the exemplary thrust collar 501. The piece 590 includes axially disposed external surfaces 594 and 598 and a substantially radially disposed surface 593 (at a radius $r_{590}$) that defines a bore 591. The bore 591 may receive a surface of a shaft as described with respect to FIG. 5B.

The cap 570 abuts the external surface 598 of the cylindrical piece 590 and has an axially disposed external surface 574. The cap 570 may be a substantially annular section of about 360° and of an axial length approximately equal to the difference in axial length between the piece 580 of FIGS. 4A and 4B and the piece 590.

The axial length of the cap 570 may correspond to the distance $\Delta Z_{TC}$. The cap 570 includes a substantially radially disposed surface 575 (at a radius $r_{570}$) that defines a bore 571, which has a smaller radius than the bore 591 ($r_{570} < r_{590}$). The different radii ($\Delta r = r_{590} - r_{570}$) of the piece 590 and the cap 570 act to define a step surface 596, which is capable of seating a surface of a shaft.

The cap 570 is optionally a weld, a braze, etc. The cap 570 is optionally connected to the piece 590 via a mechanical mechanism, a chemical mechanism or a weld, a braze, etc. Mechanical mechanisms may include screws, threads, rivets, etc. The cap 570 and the piece 590 are optionally of the same material (e.g., stainless steel, titanium, aluminum, etc.).

The cap 570, once fixed to the piece 590, allows for parallelism between a shaft surface and a back end surface of a compressor wheel. In particular, the cap 570 may include two parallel surfaces where one surface seats a shaft and another surface seats a compressor wheel.

Thus, an exemplary thrust collar may include a substantially annular body 590 and an end cap 570 that define a stepped bore and that include an axis of rotation (e.g., z-axis), opposing end surfaces 574, 594 where the end surface 574 is substantially normal to the axis of rotation and capable of seating a surface of a compressor wheel, and a surface 596 disposed in the stepped bore where the surface 596 is substantially normal to the axis of rotation and capable of seating a surface of a shaft.

The exemplary thrust collar 501 optionally includes one or more grooves 597 and 599 that may serve one or more purposes. For example, the groove 597 may be used to seat a seal ring to form a seal between the thrust collar 501 and a center housing of a turbocharger (see, e.g., FIG. 3) and the groove 599 may assist in lubrication of the thrust collar.

FIG. 5B shows the exemplary thrust collar 501 of FIG. 5A along with a turbocharger shaft 320. The shaft 320 includes a compressor wheel shaft portion 222 and a surface 326 that meets the internal surface 596 of the stepped bore of the thrust collar 501. The stepped bore (stepped between bore 571 and bore 591) of the thrust collar 501 receives at least a portion of the shaft 320, the portion labeled 522, which extends a distance along the z-axis into the bore 591 of the thrust collar 501 to meet the surface 596. The radially disposed surface 593 of the thrust collar 501 meets a radially disposed surface of the shaft portion 322. The compressor wheel shaft portion 222 extends into the bore 571 of the thrust collar 501 where a radially disposed surface 224 of the shaft portion 222 meets the radially disposed surface 575 of the cap 570 of the thrust collar.

The distance $\Delta Z_{CG}$ is shown whereby part of the distance includes the distance $\Delta Z_{TC}$, as described in FIG. 5A. The internally located axial face 596 of the exemplary thrust collar 501 allows for shortening of the distance $\Delta Z_{CG}$ and improved balancing of a rotating group of a turbocharger. Further, in this example, the exemplary thrust collar 501 only requires shaft modifications, i.e., the center housing, the compressor wheel, etc., need not be modified to accommodate the exemplary thrust collar 501. In various examples, a cap may be capable of seating a shaft and a back surface of a compressor wheel and thereby defining the distance $\Delta_{TC}$ and, in part, $\Delta_{CG}$.

Figure 6A:
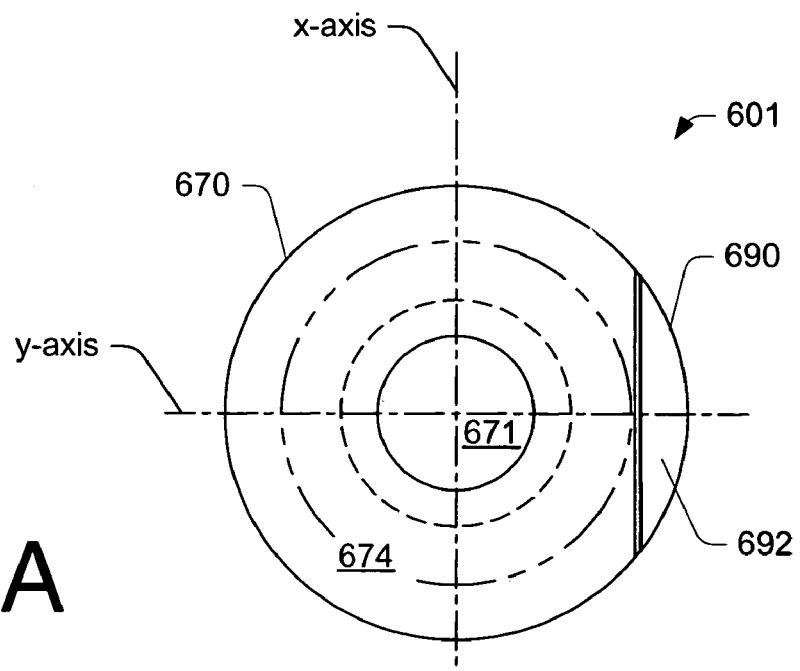
FIG. 6A is a side view of an exemplary thrust collar.
Figure 6B:
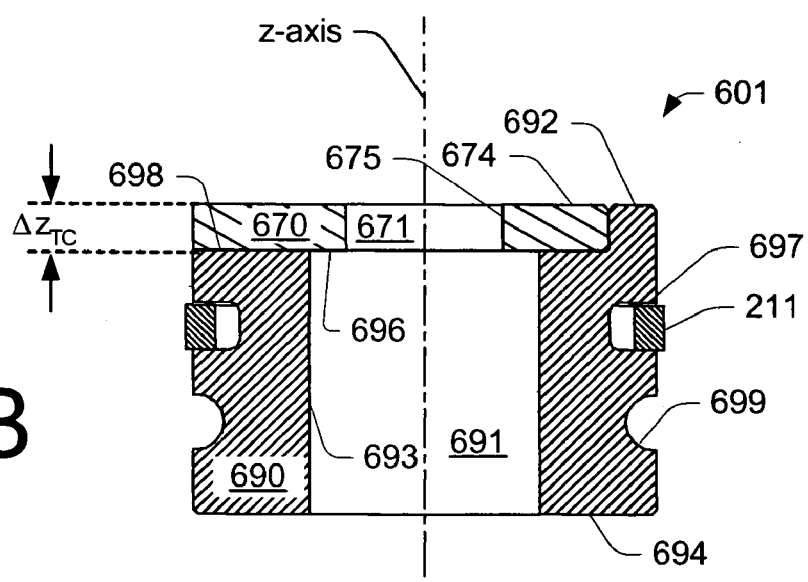
FIG. 6B is a cross-sectional view of the exemplary thrust collar of FIG. 6A.

FIGS. 6A and 6B show another exemplary thrust collar 601 that includes a cylindrical piece 690 with an end cap 670. FIG. 6A shows a side view of the exemplary thrust collar 601 (in an xy-plane) while FIG. 6B shows a cross-sectional view of the exemplary thrust collar 601. In this example, a portion of the cylindrical piece 690 acts to prevent rotation of the end cap 670 with respect to the cylindrical piece 690. The portion of the cylindrical piece 690 that prevents rotation of the end cap 670 may be referred to as an anti-rotation feature.

As shown in FIG. 6A, the exemplary thrust collar 601 includes an end cap 670 with an outward facing surface 674 and a bore 671 and a cylindrical piece 690 with an outward facing surface 692. The surface 674 is capable of seating a back surface of a compressor wheel. In instances where the surface 692 is flush with the surface 674, both surfaces may be capable of seating a back surface of a compressor wheel.

The outward facing surface 692 is part of an anti-rotation or locating feature for the end cap 670. An anti-rotation or locating feature may take the form of a tang or a clevis where a matching end cap includes a clevis or a tang. In the example of FIG. 6A, the cylindrical piece 690 has an outward extending portion, having a cross-section of a section of a circle, which matches a substantially flat circumferential edge of the end cap 670. An exemplary multipiece thrust collar optionally includes one or more anti-rotation or locating features.

With respect to anti-rotation, such a feature acts to prevent rotation of another piece when the cooperating pieces are not fixed (e.g., mechanical fixation, chemical fixation, other fixation). With respect to locating, such a feature may act to locate pieces with respect to one another when the cooperating pieces are fixed (e.g., mechanical fixation, chemical fixation, other fixation).

As in various other examples, the exemplary thrust collar 601 reduces imbalance by shortening the distance between the center of gravity of a compressor wheel and a locating surface of a turbocharger shaft. In FIG. 6B, a distance $\Delta Z_{TC}$ represents the minimum axial distance between a surface of a compressor wheel and a surface of shaft. This distance is substantially shorter than in prior art turbochargers and thrust collars.

As shown in FIG. 6B, the exemplary thrust collar 601 includes the cylindrical piece 690 and the cap 670. When assembled, the cylindrical piece 690 and the cap 670 form the exemplary thrust collar 601. The piece 690 includes axially disposed external surfaces 694 and 698 and a substantially radially disposed surface 693 that defines a bore 691. The bore 691 may receive a surface of a shaft.

The cap 670 abuts the external surface 698 of the cylindrical piece 690 and has an axially disposed external surface 674. The cap 670 may be a substantially annular section of about 360° and of an axial length approximately equal to the difference in axial length between the piece 580 of FIGS. 4A and 4B and the piece 590 of FIGS. 5A and 5B. The cap 670 may include a feature for anti-rotation or for locating the cap 670 with respect to the piece 690. In this example, the cap 670 has a substantially flat circumferential edge that abuts a portion of the piece 690.

The axial length of the cap 670 may correspond to the distance $\Delta Z_{TC}$. Further, the axial length of the portion having surface 692 may correspond to the distance $\Delta Z_{TC}$. The cap 670 includes a substantially radially disposed surface 675 that defines a bore 671, which has a smaller radius than the bore 691. The different radii of the piece 690 and the cap 670 act to define a step surface 696, which is capable of seating a surface of a shaft.

The cap 670 is optionally a weld, a braze, etc. The cap 670 is optionally connected to the piece 690 via a mechanical mechanism, a chemical mechanism or a weld, a braze, etc. Mechanical mechanisms may include screws, threads, rivets, etc. The cap 670 and the piece 690 are optionally of the same material (e.g., stainless steel, titanium, aluminum, etc.).

The cap 670, once cooperatively positioned with respect to the piece 690, allows for parallelism between a shaft surface and a back end surface of a compressor wheel. In particular, the cap 670 may include two parallel surfaces where one surface seats a shaft and another surface seats a compressor wheel.

Thus, an exemplary thrust collar may include a substantially annular body 690 and an end cap 670 that define a stepped bore and that include an axis of rotation (e.g., z-axis), opposing end surfaces 674, 694 where the end surface 674 is substantially normal to the axis of rotation and capable of seating a surface of a compressor wheel, and a surface 696 disposed in the stepped bore where the surface 696 is substantially normal to the axis of rotation and capable of seating a surface of a shaft. Another surface, the surface 692 of the body 690, is also optionally capable of seating a surface of a compressor wheel.

The exemplary thrust collar 601 optionally includes one or more grooves 697 and 699 that may serve one or more purposes. For example, in FIG. 6B, the groove 697 is shown seating a seal ring 211 to form a seal between the thrust collar 601 and a center housing of a turbocharger (see, e.g., FIG. 3). The groove 699 may assist in lubrication of the thrust collar.

With respect to an assembly that includes the exemplary thrust collar 601 and a turbocharger shaft, the shaft may include a compressor wheel shaft portion and a surface that meets the internal surface 696 of the stepped bore of the thrust collar 601. The stepped bore (stepped between bore 671 and bore 691) of the thrust collar 601 may receive at least a portion of the shaft extending a distance along the z-axis into the bore 691 to meet the surface 696. The radially disposed surface 693 of the thrust collar 601 may meet a radially disposed surface of the shaft portion. The compressor wheel shaft portion may extend into the bore 671 of the thrust collar 601 where a radially disposed surface of the shaft portion meets the radially disposed surface 675 of the cap 670 of the thrust collar.

Such an assembly may have a distance $\Delta Z_{CG}$ whereby part of the distance includes the distance $\Delta Z_{TC}$, as described in FIG. 6B. In such an assembly, the internally located axial face 696 of the exemplary thrust collar 601 allows for shortening of the distance $\Delta Z_{CG}$ and improved balancing of a rotating group of a turbocharger. Further, in this example, the exemplary thrust collar 601 only requires shaft modifications, i.e., the center housing, the compressor wheel, etc., need not be modified to accommodate the exemplary thrust collar 601. In various examples, a cap or other piece may be capable of seating a shaft and a back surface of a compressor wheel and thereby defining the distance $\Delta_{TC}$ and, in part, $\Delta_{CG}$. The distances $\Delta_{TC}$ and $\Delta_{CG}$ may be considered balancing parameters.

As described herein, various exemplary thrust collars include a substantially annular body (e.g., 380, 590, 690) and optionally an end cap (e.g., 570, 670) that define a stepped bore (e.g., 381, 571 and 591, 671 and 691) and that include an axis of rotation (e.g., z-axis), opposing end surfaces (e.g., 388 and 384; 574 and 594; 674 and 694 and optionally 692) where one of the end surfaces (e.g., 388, 574, 674) is substantially normal to the axis of rotation and capable of seating a back end of compressor wheel, and a surface (e.g., 386, 596, 696) disposed in the stepped bore where the surface is substantially normal to the axis of rotation and capable of seating a surface of a shaft.

The bore of an exemplary thrust collar typically includes more than one radius as measured from the axis of rotation. For example, the smallest radius of a bore may correspond to an opening adjacent the end surface for seating a back end of a compressor wheel and the largest radius of a bore may corresponds to the surface disposed in the bore for seating a surface of a shaft. The surface disposed in the bore for seating a surface of a shaft optionally includes an annular face.

In various exemplary thrust collars, the maximum axial distance between the end surface for seating a back end of a compressor wheel and the surface disposed in the bore for seating a surface of a turbocharger shaft is approximately half or less the length of a conventional thrust collar. Various exemplary thrust collars include one or more pieces and optionally a cap, which may be a weld, braze, etc. Various exemplary thrust collars optionally include an anti-rotation or locating feature.

In various examples, the distance between the axial position of the surface disposed in the bore for seating a surface of a shaft and the axial position of the center of gravity of a compressor wheel can define a balancing parameter.

An exemplary rotating assembly includes: a compressor wheel that includes an axis of rotation, a nose end and a back end; a shaft coincident with the axis of rotation and operably coupled to the compressor wheel; and a thrust collar that includes a substantially annular body that defines a bore and further includes opposing end surfaces where one of the end surfaces is substantially normal to the axis of rotation and seats the back end of compressor wheel, and a surface disposed in the bore where the surface is substantially normal to the axis of rotation and seats a surface of the shaft, the surface of the shaft being substantially normal to the axis of rotation of the shaft.

Although some exemplary methods, devices, systems, arrangements, etc., have been illustrated in the accompanying Drawings and described in the foregoing Detailed Description, it will be understood that the exemplary embodiments disclosed are not limiting, but are capable of numerous rearrangements, modifications and substitutions without departing from the spirit set forth and defined by the following claims.

What is claimed is:

1. A thrust collar for a turbocharger, the thrust collar comprising:
    an axis of rotation;
    an annular groove capable of receiving a seal ring;
    a stepped bore;
    opposing end surfaces wherein a plane of one of the end surfaces is substantially normal to the axis of rotation and capable of seating a back end of compressor wheel; and
    an inner surface disposed in the stepped bore wherein a plane of the inner surface is substantially normal to the axis of rotation and capable of seating a shaft surface of a turbocharger shaft.

2. The thrust collar of claim 1 further comprising one or more pieces.

3. The thrust collar of claim 2 wherein one of the pieces comprises a cap.

4. The thrust collar of claim 1 wherein the bore comprises more than one radii as measured from the axis of rotation.

5. The thrust collar of claim 4 wherein the smallest radius of the bore corresponds to an opening adjacent the end surface for seating a back end of a compressor wheel.

6. The thrust collar of claim 4 wherein the largest radius of the bore corresponds to the inner surface.

7. The thrust collar of claim 1 wherein the inner surface comprises an annular face.

8. The thrust collar of claim 1 wherein the distance between an axial position of the inner surface and the axial position of the center of gravity of a compressor wheel defines a balancing parameter.

9. A rotating assembly comprising:
    a housing that supports a shaft bearing;
    a compressor wheel that comprises an axis of rotation, a nose end and a back end;
    a shaft coincident with the axis of rotation and operably coupled to the compressor wheel;
    a thrust collar that comprises
        a bore,
        opposing end surfaces wherein a plane of one of the end surfaces is substantially normal to the axis of rotation and seats the back end of compressor wheel, and
        an inner surface disposed in the bore of the thrust collar wherein a plane of the inner surface is substantially normal to the axis of rotation and seats a shaft surface of the shaft, a plane of the shaft surface being substantially normal to the axis of rotation of the shaft; and
    a seal between the thrust collar and the housing.

10. The rotating assembly of claim 9 wherein the shaft comprises a turbocharger shaft.

11. The rotating assembly of claim 9 wherein the thrust collar further comprising an annular groove for receiving a seal ring.

12. The rotating assembly of claim 9 wherein the axial distance between an axial position of the inner surface and the axial position of the center of gravity of the compressor wheel defines a balancing parameter.

13. The rotating assembly of claim 9 wherein the thrust collar comprises a plurality of cooperating pieces.

14. The rotating assembly of claim 13 wherein one of the pieces comprises a cap.

15. The rotating assembly of claim 13 wherein the thrust collar comprises an anti-rotation feature to prevent rotation of one of the pieces with respect to another of the pieces.

16. The rotating assembly of claim 13 wherein the thrust collar comprises a tang and a clevis.

17. The rotating assembly of claim 9 wherein the bore of the thrust collar comprises more than one radii as measured from the axis of rotation.

18. The rotating assembly of claim 17 wherein the smallest radius of the bore corresponds to an opening adjacent the end surface that seats the back end of the compressor wheel.

19. The rotating assembly of claim 17 wherein the largest radius of the bore corresponds to the inner surface.

20. The rotating assembly of claim 9 wherein the inner comprises an annular face.

21. A turbocharger comprising the rotating assembly of claim 9.

22. A rotating assembly comprising:
    a compressor wheel that comprises an axis of rotation, a nose end and a back end;
    a shaft coincident with the axis of rotation and operably coupled to the compressor wheel; and
    a thrust collar that comprises
        a bore,
        an annular groove for receiving a seal ring,
        opposing end surfaces wherein a plane of one of the end surfaces is substantially normal to the axis of rotation and seats the back end of compressor wheel, and
        an inner surface disposed in the bore wherein a plane of the surface is substantially normal to the axis of rotation and seats a shaft surface of the shaft, a plane of the shaft surface being substantially normal to the axis of rotation of the shaft.

23. The rotating assembly of claim 22 wherein the axial distance between an axial position of the inner surface and the axial position of the center of gravity of the compressor wheel defines a balancing parameter.

24. A turbocharger comprising the rotating assembly of claim 22.

25. A rotating assembly comprising:
    a compressor wheel that comprises an axis of rotation, a nose end and a back end;

a shaft coincident with the axis of rotation and operably coupled to the compressor wheel; and a thrust collar that comprises a plurality of cooperating pieces, an anti-rotation feature to prevent rotation of one of the pieces with respect to another of the pieces, a bore, opposing end surfaces wherein a plane of one of the end surfaces is substantially normal to the axis of rotation and seats the back end of compressor wheel, and an inner surface disposed in the bore wherein a plane of the surface is substantially normal to the axis of rotation and seats a shaft surface of the shaft, a plane of the shaft surface being substantially normal to the axis of rotation of the shaft.

26. The rotating assembly of claim 25 wherein the axial distance between an axial position of the inner surface and the axial position of the center of gravity of the compressor wheel defines a balancing parameter.

27. A turbocharger comprising the rotating assembly of claim 25.

28. A rotating assembly comprising:

a compressor wheel that comprises an axis of rotation, a nose end and a back end;

a shaft coincident with the axis of rotation and operably coupled to the compressor wheel; and a thrust collar that comprises a tang and a clevis, a bore, opposing end surfaces wherein a plane of one of the end surfaces is substantially normal to the axis of rotation and seats the back end of compressor wheel, and an inner surface disposed in the bore wherein a plane of the surface is substantially normal to the axis of rotation and seats a shaft surface of the shaft, a plane of the shaft surface being substantially normal to the axis of rotation of the shaft.

29. The rotating assembly of claim 28 wherein the axial distance between an axial position of the inner surface and the axial position of the center of gravity of the compressor wheel defines a balancing parameter.

30. A turbocharger comprising the rotating assembly of claim 28.

* * * * *